United States Patent
Nielsen et al.

(10) Patent No.: US 8,600,848 B2
(45) Date of Patent: Dec. 3, 2013

(54) METHODS, APPARATUS AND SYSTEMS FOR ENSURING WAGE AND HOUR COMPLIANCE IN LOCATE OPERATIONS

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 237 days.

(21) Appl. No.: 12/940,820

(22) Filed: Nov. 5, 2010

(65) Prior Publication Data

US 2011/0137769 A1    Jun. 9, 2011

Related U.S. Application Data

(60) Provisional application No. 61/258,361, filed on Nov. 5, 2009.

(51) Int. Cl.
*G06F 15/02* (2006.01)
*G07C 1/10* (2006.01)

(52) U.S. Cl.
USPC ................................ 705/32; 70/30

(58) Field of Classification Search
None
See application file for complete search history.

(56) References Cited

U.S. PATENT DOCUMENTS

| | | | |
|---|---|---|---|
| 5,056,454 A | 10/1991 | Turner | |
| 5,495,531 A * | 2/1996 | Smiedt | 705/59 |
| 6,148,292 A * | 11/2000 | Reisinger et al. | 705/30 |
| 7,009,399 B2 | 3/2006 | Olsson et al. | |
| 7,123,152 B2 | 10/2006 | Contractor | |
| 7,640,105 B2 | 12/2009 | Nielsen et al. | |
| 8,060,304 B2 | 11/2011 | Nielsen et al. | |
| 8,126,788 B2 * | 2/2012 | Pappas et al. | 705/32 |
| 8,155,390 B2 | 4/2012 | Nielsen et al. | |
| 8,194,932 B2 | 6/2012 | Nielsen et al. | |
| 8,218,827 B2 | 7/2012 | Nielsen et al. | |
| 8,249,306 B2 | 8/2012 | Nielsen et al. | |
| 8,260,489 B2 | 9/2012 | Nielsen et al. | |
| 8,265,344 B2 | 9/2012 | Nielsen et al. | |
| 8,270,666 B2 | 9/2012 | Nielsen et al. | |
| 8,280,117 B2 | 10/2012 | Nielsen et al. | |
| 8,280,631 B2 | 10/2012 | Nielsen et al. | |
| 8,280,969 B2 | 10/2012 | Nielsen et al. | |
| 8,290,204 B2 | 10/2012 | Nielsen et al. | |

(Continued)

OTHER PUBLICATIONS

International Search Report and Written Opinion, Application No. PCT/US10/059222, Feb. 9, 2011.

(Continued)

*Primary Examiner* — F. Zeender
*Assistant Examiner* — Christopher Buchanan

(57) ABSTRACT

Control of locating equipment used by a locate technician to perform a locate and/or marking operation to detect and/or mark a presence or an absence of at least one underground facility at a work site (e.g., locate receivers, locate transmitters, marking devices and/or combined locate and marking devices) is based on time-keeping information associated with the technician and/or wage and hour compliance information. In one example, one or more control signals are generated to at least partially enable or disable one or more piece of locating equipment based at least in part on a time clock status of the locate technician (e.g., clocked-in or clocked-out), and/or wage and hour compliance information associated with the locate technician and/or the work site (e.g., relating to required breaks and/or maximum number of work hours).

41 Claims, 5 Drawing Sheets

(56) References Cited

U.S. PATENT DOCUMENTS

| | | |
|---|---|---|
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |
| 8,424,486 B2 | 4/2013 | Nielsen et al. |
| 8,473,148 B2 | 6/2013 | Nielsen et al. |
| 8,480,332 B2 | 7/2013 | Miller |
| 2002/0087264 A1 | 7/2002 | Hills et al. |
| 2003/0069648 A1* | 4/2003 | Douglas et al. ............... 700/2 |
| 2004/0008582 A1* | 1/2004 | Richards et al. ............. 368/10 |
| 2004/0176978 A1* | 9/2004 | Simon et al. ................... 705/1 |
| 2008/0275591 A1* | 11/2008 | Chirnomas ................. 700/231 |
| 2009/0201311 A1 | 8/2009 | Nielsen et al. |
| 2009/0202101 A1 | 8/2009 | Nielsen et al. |
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0064341 A1* | 3/2010 | Aldera ............................ 726/1 |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0117654 A1 | 5/2010 | Nielsen et al. |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0043211 A1 | 2/2011 | Olsson |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |
| 2013/0147637 A1 | 6/2013 | Nielsen et al. |

OTHER PUBLICATIONS

Office Action dated Apr. 3, 2013 from U.S. Appl. No. 12/962,016.
Nielsen et al., co-pending U.S. Appl. No. 2011-0236588, published Sep. 29, 2011.
Notice of Allowance dated Jul. 10, 2013 from U.S. Appl. No. 12/962,016.

* cited by examiner

METHODS, APPARATUS AND SYSTEMS FOR ENSURING WAGE AND HOUR COMPLIANCE IN LOCATE OPERATIONS

CROSS-REFERENCE TO RELATED APPLICATION

This application claims the benefit, under 35 U.S.C. §119(e), of U.S. Provisional Patent Application No. 61/258,361, filed on Nov. 5, 2009, entitled "Time-Keeping System for and Methods of Ensuring Wage and Hour Compliance in Locate Operations," which application is hereby incorporated herein by reference in its entirety.

BACKGROUND

In workplace environments, it is common practice for employees to "clock-in" and "clock-out" (e.g., via a time-keeping system) when checking in and checking out of work, such as when arriving at work, taking a meal break, and leaving for the day. In field-based distributed workforce environments, employees may be dispatched (e.g., with a personal or work-related vehicle) directly to work locations in the field instead of reporting to a central workplace at the beginning of each day. Consequently, time-keeping systems exist by which field service employees may clock-in and clock-out remotely. For example, a field service employee may access a time-keeping system using a networked device (e.g., a cell phone or a networked portable computer such as a laptop computer or tablet device) in the vehicle being used by the field service employee in the field.

Due to the nature of field-based distributed workforce environments, it is sometimes difficult for companies to effectively monitor employee work time. As a result, it may be difficult for companies to maintain accurate employee time records and, thereby, ensure wage and hour compliance that may be based on federal, state, and/or local regulations. Additionally, with respect to operating efficiency in field-based distributed workforce environments, it may be difficult to determine whether work is actually being performed when an employee is clocked-in. Likewise, it may be difficult to ensure that work is not being performed when an employee is clocked-out.

SUMMARY

In view of the limitations of conventional time-keeping systems, Applicants have recognized and appreciated a need for improved techniques of monitoring employee work time and of maintaining accurate employee time records in field-based distributed workforce environments so as to ensure wage and hour compliance and improved operating efficiency.

While a variety of field-based distributed workforce environments would benefit from improved employee work time monitoring techniques, one illustrative example in which such improved techniques may be implemented is given by "locate and marking operations," or more simply "locate operations." In the construction industry, "locate operations" refer to the process of locating and marking underground facilities in anticipation of excavation activities. These operations typically are accomplished by a field-based distributed workforce that is dispatched to various locations pursuant to requests to perform such operations. As in other field-based distributed workforce environments, in underground facility locate operations it may be difficult for locate companies overseeing such workforces to monitor employee work time and to maintain accurate employee time records.

Accordingly, various inventive methods, apparatus and systems disclosed herein relate generally to improving employee time-keeping activities and wage and hour compliance in connection with locate and marking operations. In some exemplary implementations, control of locating equipment used by a locate technician to perform a locate and/or marking operation (e.g., to detect and/or mark a presence or an absence of at least one underground facility at a work site) is based on time-keeping information associated with the technician and/or wage and hour compliance information. In particular, one or more control signals may be generated to at least partially enable or disable one or more piece of locating equipment based at least in part on a time clock status of the locate technician (e.g., clocked-in or clocked-out), and/or wage and hour compliance information associated with the locate technician and/or the work site (e.g., relating to required breaks or "rest periods," meal breaks and start times for same, minimum hours worked per day or week before premium or overtime pay is available, maximum hours that may be worked in a given time period or work shift, etc.). In some implementations, geographic information associated with the work site (e.g., as derived from a locate request ticket and/or as provided by the locating equipment used for the locate operation) may be used to select appropriate wage and hour compliance information that may be specific to a particular geographic location/jurisdiction.

In one aspect, the locating equipment itself, and/or one or more onsite computers used by the locate technician in connection with a locate operation, may be employed to facilitate time-keeping (clocking-in and clocking-out). In some examples, a user interface associated with locating equipment or one or more other computing devices available to the locate technician may be controlled so as to automatically prompt the technician to clock-in or clock-out based on various information associated with wage and hour compliance. In another aspect, a time clock status of the locate technician and various information obtained from one or more pieces of locating equipment used in connection with the locate operation may be monitored before, during, and/or after a locate operation to generate an activity log so as to provide an electronic record of the locate operation including time-keeping information for the locate technician.

In other aspects, inventive methods, apparatus and systems disclosed herein facilitate communication between and amongst a central server operated by a locate company, one or more onsite computers at or near the work site, and various locating equipment used by locate technicians in the field to perform locate operations to implement various time-keeping functions and/or equipment control. Various functionality associated with time-keeping, control of locating equipment, and or maintenance of activity logs may be distributed amongst the various constituent components and entities associated with locate operations, or significant functionality may be controlled/implemented in a more centralized fashion (e.g., by a central server of a locate company).

In sum, one embodiment of the present invention is directed to an apparatus for controlling at least one piece of locating equipment used by a locate technician to perform a locate and/or marking operation to detect and/or mark a presence or an absence of at least one underground facility at a work site. The apparatus includes a memory to store processor-executable instructions and at least one processing unit communicatively coupled to the memory, wherein upon execution of the processor-executable instructions, the at least one processing unit generates at least one control signal to at least partially enable or disable the at least one piece of locating equipment based at least in part on a time clock status of the locate technician; and/or wage and hour compliance information associated with the locate technician and/or the work site.

Another embodiment is directed to a computer-implemented method for controlling at least one piece of locating equipment used by a locate technician to perform a locate and/or marking operation to detect and/or mark a presence or an absence of at least one underground facility at a work site. The method comprises: A) monitoring a time clock status of the locate technician and/or wage and hour compliance information associated with the locate technician and/or the work site; and B) generating at least one control signal to at least partially enable or disable the at least one piece of locating equipment based at least in part on A).

Another embodiment is directed to at least one non-transitory computer-readable storage medium encoded with processor-executable instructions that, when executed by at least one processing unit, perform a method for controlling at least one piece of locating equipment used by a locate technician to perform a locate and/or marking operation to detect and/or mark a presence or an absence of at least one underground facility at a work site. The method comprises: A) monitoring a time clock status of the locate technician and/or wage and hour compliance information associated with the locate technician and/or the work site; and B) generating at least one control signal to at least partially enable or disable the at least one piece of locating equipment based at least in part on A).

Another embodiment of the present invention is directed to a computer-implemented method for time-keeping control of an underground facility locate operation. The method includes associating user identification information with a user of locating equipment used to perform the locate operation. A time clock status of the user is determined based on the user identification information. The operation of the locating equipment is enabled if the user is determined to be clocked in. If the user is determined to be clocked out, the operation of at least a portion of the locating equipment is disabled.

Yet another embodiment of the present invention is directed toward a computer-readable storage medium encoded with computer-readable instructions that, as a result of being executed by a computing device, control the computing device to perform a method for time-keeping control of an underground facility locate operation. The method includes associating user identification information with a user of locating equipment that performs the locate operation. Based on the user identification information, a time clock status of the user is determined. The operation of the locating equipment is enabled if the user is determined to be clocked in. If the user is determined to be clocked out, the operation of at least a portion of the locating equipment is disabled.

Another embodiment of the present invention is directed to locating equipment for performing at least part of an underground facility locate operation. The locating equipment includes a locate mechanism to perform at least part of the underground facility locate operation, a processing device, and a memory. The memory contains a time-keeping control application, for execution by the processing device, to associate user identification information with a user of the locating equipment, to determine, based on the user identification information, a time clock status of the user, to enable operation of the locate mechanism if the user is determined to be clocked-in, and to disable operation of the locate mechanism if the user is determined to be clocked-out.

Yet another embodiment of the present invention is directed toward a locate operations time-keeping system. The locate operations time-keeping system includes a central server including a time-keeping application configured to maintain employee time records and wage and hour information. The system further includes locating equipment configured to perform at least part of a locate operation when operated by a user. An onsite computer configured to perform time-keeping control of the locating equipment in response to employee time records and wage and hour information received from the time-keeping application in the central server and user identification information received from the locating equipment, wherein operation of the locating equipment is enabled if the user is determined to be clocked-in and wherein operation of at least a portion of the locating equipment is disabled if the user is determined to be clocked-out is also part of the system.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0198663 A1, published Aug. 5, 2010, filed Feb. 5, 2010, and entitled "Methods and Apparatus for Overlaying Electronic Marking Information on Facilities Map Information and/or Other Image Information Displayed on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2010-0205264-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0205031-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0201706-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205555-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205195-A1, published Aug. 12, 2010, filed Jun. 1, 2009, and entitled "Methods and Apparatus for Associating a Virtual White Line (VWL) Image with Corresponding Ticket Information for an Excavation Project;"

U.S. publication no. 2010-0205536-A1, published Aug. 12, 2010, filed Jun. 1, 2009, and entitled "Methods and Apparatus for Controlling Access to a Virtual White Line (VWL) Image for an Excavation Project;"

U.S. publication no. 2010-0228588-A1, published Sep. 9, 2010, filed Feb. 11, 2010, and entitled "Management System, and Associated Methods and Apparatus, for Providing Improved Visibility, Quality Control and Audit Capability for Underground Facility Locate and/or Marking Operations;"

U.S. publication no. 2010-0201690-A1, published Aug. 12, 2010, filed Apr. 13, 2009, and entitled "Virtual White Lines (VWL) Application for Indicating a Planned Excavation or Locate Path;"

U.S. publication no. 2010-0205554-A1, published Aug. 12, 2010, filed Apr. 13, 2009, and entitled "Virtual White Lines (VWL) Application for Indicating an Area of Planned Excavation;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2010-0205032-A1, published Aug. 12, 2010, filed Feb. 11, 2010, and entitled "Marking Apparatus Equipped with Ticket Processing Software for Facilitating Marking Operations, and Associated Methods;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the illustrated embodiments. The present invention, together with further objectives and advantages, may be best understood by reference to the following description, taken in connection with the accompanying drawings as set forth below.

DETAILED DESCRIPTION

Following below are more detailed descriptions of various concepts related to, and embodiments of, inventive methods, apparatus and systems for time-keeping and ensuring wage and hour compliance in underground facility locate operations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
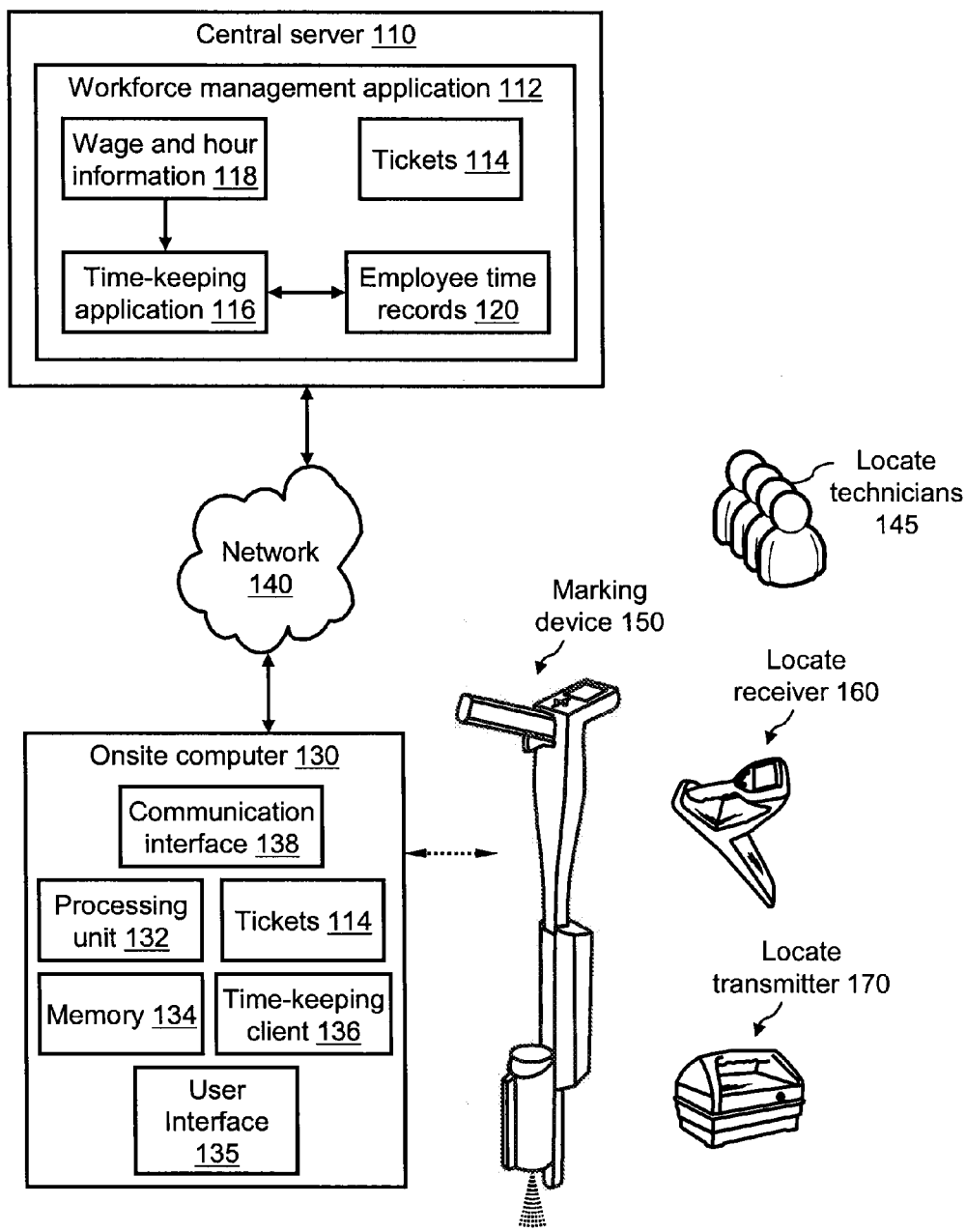
FIG. 1 is a functional block diagram of an exemplary locate operations time-keeping system for ensuring wage and hour compliance in locate operations, according to illustrative embodiments.

FIG. 1 is a functional block diagram of an exemplary time-keeping system 100 for ensuring wage and hour compliance in locate operations. Time-keeping system 100 may include a central server 110, which is maintained and operated by, for example, a locate company (not shown). Central server 110 may include any local or centralized computing device that is capable of hosting an application. In implementation, central server 110 may include a networked application server and/or web server that is connected to a network 140.

Residing on central server 110 may be a workforce management application 112, which may include business software for assigning locate request tickets (e.g., tickets 114) and dispatching personnel (e.g., locate technicians 145) into the field. Workforce management application 112 may further include a time-keeping application 116. Wage and hour information 118 may provide an input to time-keeping application 116. An output of time-keeping application 116 may include one or more employee time records 120.

The contents of wage and hour information 118 may include the wage and hour guidelines of one or more regulatory bodies, such as federal, regional, state, and/or local wage and hour guidelines, and/or guidelines of a company for which a technician works. Generally speaking, examples of wage and hour information include, but are not limited to, information relating to required breaks or "rest periods," meal breaks and start times for same, minimum hours worked per day or week before premium or overtime pay is available, maximum hours that may be worked in a given time period or work shift, and the like. In some implementations, geographic information associated with the work site (e.g., as derived from a locate request ticket and/or as provided by the locating equipment used for the locate operation) may be used to select appropriate wage and hour compliance information that may be specific to a particular geographic location/jurisdiction.

More specifically, wage and hour information 118 may include information pertaining to requirements for work breaks. For instance, a non-limiting example of requirements for work breaks during a work shift are provided in the table below.

| Number of Hours Worked | Number of 10 minute rest periods |
| --- | --- |
| At least 3.5 hours | 1 rest period |
| More than 6 hours | 2 rest periods |
| More than 10 hours | 3 rest periods |
| More than 14 hours | 4 rest periods |

Wage and hour information 118 may also include overtime regulations. Overtime regulations may include rules regarding the minimum hours worked per day before a premium wage is applied. A minimum number of hours worked per week before a premium wage is applied may also be included in the wage and hour information 118. Requirements for meal breaks, which are normally longer in duration than a work break and occur with less frequency than work breaks, may also be included in the wage and hour information 118. An illustrative example of meal break requirements are shown in the table below.

| | |
| --- | --- |
| Minimum Consecutive Hours Worked for Unpaid Meal Break | 7.5 hours |
| Meal Period Start Time | After second hour of workday, before the last 2 hours of workday |

Central server 110 is accessible to any other entities of locate operations time-keeping system 100 that are connected to network 140. Network 140 may include, for example, any local area network (LAN) and/or wide area network (WAN) for connecting to the Internet. Network 140 provides the communication link between any and/or all entities of locate operations time-keeping system 100. For example, network 140 provides the communication network by which information may be exchanged between central server 110, at least one onsite computer 130 and/or locating equipment that are used by locate technicians 145 in the field.

Onsite computer 130 may include any computing device or devices that are capable of processing and executing program instructions. Onsite computer 130 may be used by locate technicians 145 performing locate operations in the field. For example, onsite computer 130 may be a portable computer, a personal computer, a tablet device, a personal digital assistant (PDA), a cellular radiotelephone, a mobile computing device, a touch-screen device, a touchpad device, or generally any device including, or connected to, a processor and a user interface. Preferably, onsite computer 130 is a portable computing device, such as a laptop computer or tablet device. Onsite computer 130 may be carried by a locate technician or installed in the vehicle of the locate technician, for example.

Onsite computer 130 may be used by locate technicians 145 to process tickets 114 and to perform locate operations accordingly. Tickets may be a locate request ticket. The locate request ticket essentially constitutes an instruction to inspect a work site and typically identifies the work site of the proposed excavation or design and a description of the dig area. The locate request ticket may also typically list all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.).

Locate operations time-keeping system 100 is shown in FIG. 1 with one onsite computer 130 and one set of locating equipment 150, 160, and 170. It will be understood that a typical locate operations time-keeping system 100 may include the central server 110 and several onsite computers 130 at one dig site and/or at multiple dig sites. Further, each onsite computer 130 may communicate with at least one piece of locating equipment, including, but not limited to, one or more marking devices 150, one or more locate receivers 160 and/or one or more locate transmitters 170. In some embodiments, each locate technician may be equipped with an onsite computer 130.

Additionally, onsite computer 130 may be used for processing information from time-keeping application 116 of central server 110. For example, onsite computer 130 may include a processing unit 132, which may be any standard controller or microprocessor device that is capable of executing program instructions, such as those from time-keeping application 116. Onsite computer 130 may also include a memory 134, which may comprise any computer-readable media for storing any information that is processed locally at onsite computer 130. The memory 134 may store computer instructions (also referred to herein as "processor-executable instructions") for implementing the various functionalities described herein. Processing unit 132 and memory 134 may be used for managing the overall operations of onsite computer 130. In one example, time-keeping information from time-keeping application 116 may be cached locally in memory 134, which may be useful in the event that connectivity is lost between onsite computer 130 and central server 110. Additionally, onsite computer 130 may include a time-keeping client 136, which is a counterpart to time-keeping application 116 of central server 110. For example, time-keeping client 136 may be used to process information received from or transmitted to time-keeping application 116 of central server 110.

Further, onsite computer 130 may include a communication interface 138 for connecting to network 140 and/or for communication with locating equipment. For example, communication interface 138 may be any wired and/or wireless communication interface by which information may be exchanged between any entities of locate operations time-keeping system 100. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

As also shown in FIG. 1, the onsite computer 130 may include a user interface 135 communicatively coupled to the processing unit 132 to provide information to or receive information from the locate technician. As discussed in greater detail below, the user interface 135, as well as user interfaces associated with one or more pieces of locating equipment such as marking device 150, locate receiver 160, and locate transmitter 170, may be employed to facilitate time-keeping (clocking-in and clocking-out). In some examples, a user interface associated with locating equipment or one or more other computing devices available to the locate technician may be controlled so as to automatically prompt the technician to clock-in or clock-out based on various information associated with wage and hour compliance (e.g., requirements for breaks of a certain duration and/or at certain times during a given work shift; limitations on maximum hours that may be worked in a given time period or work shift, etc.).

Locate technicians 145 may use locating equipment in order to perform a locate operation. In one example, the locating equipment may include a marking device 150, a locate receiver 160, a locate transmitter 170, and any combinations thereof. A locate receiver, such as locate receiver 160, is an instrument for detecting facilities that are concealed in some manner, such as cables and pipes that are located underground. A locate receiver detects electromagnetic fields that are emitted from a facility. A signal, or lack thereof, detected by the locate receiver indicates the presence or absence of a facility. The source of the detection signal along the facility may be a locate transmitter, such as locate transmitter 170. Once the presence or absence of a facility is detected, a marking device, such as marking device 150, is used to dispense a marking material on, for example, the surface of the ground at the location of the facility in order to indicate the presence or absence of a facility or facilities. Marking material may be any material, substance, compound, and/or element which may be used separately or in combination to mark, signify, and/or indicate the presence or absence of a facility. Examples of marking materials may include, but are not limited to, paint, chalk, dye, and/or marking powder, such as iron. The color of the marking material is typically chosen based on the type of underground facility that is being marked (e.g., red paint for a power line).

Preferably, marking device 150, locate receiver 160, and locate transmitter 170 are capable of processing information in real time from time-keeping application 116 of central server 110. Onsite computer 130 may be used, for example, to exchange information between time-keeping application 116 of central server 110 and marking device 150, locate receiver 160, and/or locate transmitter 170 during locate operations. Marking device 150, locate receiver 160, and locate transmitter 170 are described with reference to FIGS. 2A, 2B, and 2C, respectively.

Time-keeping application 116 manages and monitors the time clock status (i.e., clocked-in or clocked-out) of users in the field, such as locate technicians 145. Further, time-keeping application 116 may communicate the time clock status of locate technician 145 to his/her associated onsite computer 130, marking device 150, locate receiver 160, locate transmitter 170, and any combinations thereof. For example, marking device 150, locate receiver 160, and/or locate transmitter 170 may be allowed to operate only when the associated locate technician 145 is clocked-in. As a result, work is allowed to be performed only when the locate technician 145 is clocked-in. For example, a clocked-in status of the locate technician 145 may be communicated to onsite computer 130 and then passed to marking device 150, locate receiver 160, and/or locate transmitter 170 in order to enable the locating equipment and, thereby, allow locate operations to occur. In like manner, work is not allowed to be performed when the locate technician 145 is clocked-out. For example, a clocked-out status of the locate technician 145 may be communicated to onsite computer 130 and then passed to marking device 150, locate receiver 160, and/or locate transmitter 170 in order to disable the locating equipment and prevent locate operations from occurring.

Time-keeping application 116 determines the time clock status of an individual user by associating user identification information with the clocked-in or clocked-out status of the user. The user identification information may include user name, user clock number, password and/or other user identification, for example. In some embodiments, the user clocks in and clocks out at onsite computer 130, and/or the associated locating equipment, such as marking device 150, locate receiver 160 and locate transmitter 170. In one illustrative embodiment, the locating equipment assumes that the user of the locate equipment is the same as the user that clocked-in at onsite computer 130. In other embodiments, the locating equipment requires a user attempting to operate the equipment to enter user identification information in order for the locating equipment to determine the time clock status of the user. This approach is beneficial, for example, in situations that involve more than one user of the locating equipment. This approach is also beneficial with respect to security, i.e., preventing an unauthorized person from operating the locating equipment. In further embodiments, the user may clock-in and clock-out by entering his/her user identification information at the locating equipment.

The user identification information may be entered, for example, via a keypad, via a touch screen, or via a smart card and smart card reader. In further embodiments, the user identification information may be biometric information of the user, such as, for example, fingerprint data or iris image data. In addition, identification information representative of the locating equipment, such as, for example, equipment serial number, may be associated by time-keeping application 116 with the user identification information and the time clock status of the user. In some embodiments, the time-keeping application 116 may generate an alert if the user is not authorized to use the locating equipment.

Additionally, time-keeping application 116 may automatically enable and disable locating equipment in the field according to applicable wage and hour guidelines that are provided by wage and hour information 118. In this way, time-keeping application 116 may be used to ensure wage and hour compliance of personnel using the locating equipment. For example, when a 30-minute meal break is required, time-keeping application 116 prevents locating equipment from being enabled until at least 30 minutes has elapsed from the beginning of the meal break. A method of operation of locate operations time-keeping system 100 is described with reference to FIG. 3.

Further, time-keeping application 116 may automatically generate prompts to locate technicians in real time with respect to clocking in and clocking out according to wage and hour information 118. For example, when a break time is due, time-keeping application 116 may automatically transmit a real-time prompt indicating the same to the locate technician via onsite computer 130 and/or marking device 150, locate receiver 160, and/or locate transmitter 170. Additionally, the real-time prompts may be delivered in advance of the actual break time that is due in order to provide advanced notice to locate technicians. For example, time-keeping application 116 may automatically transmit a real-time prompt, for example, 15, 30, or 60 minutes in advance of the actual break time that is due. A method of real-time interaction with respect to employee time keeping using locate operations time-keeping system 100 is described with reference to FIGS. 4A and 4B.

Figure 2A:
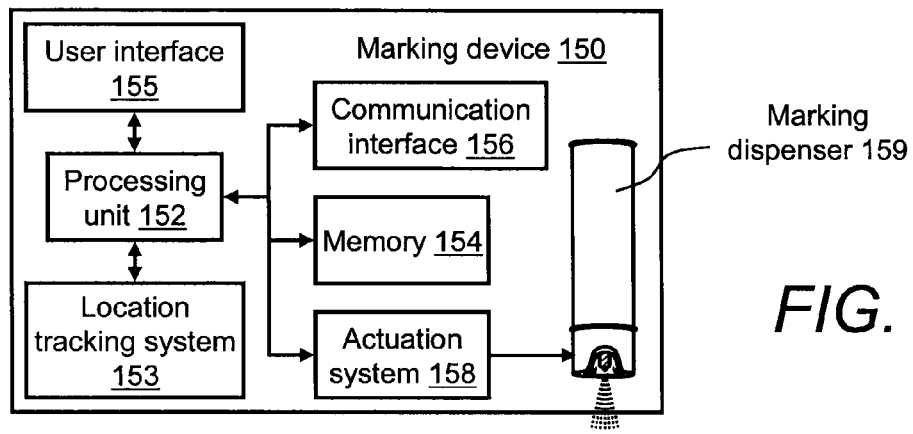
FIGS. 2A, 2B, and 2C are functional block diagrams of an exemplary marking device, a locate receiver, and a locate transmitter, respectively, that are suitable for use in the locate operations time-keeping system, according to illustrative embodiments.
Figure 2B:
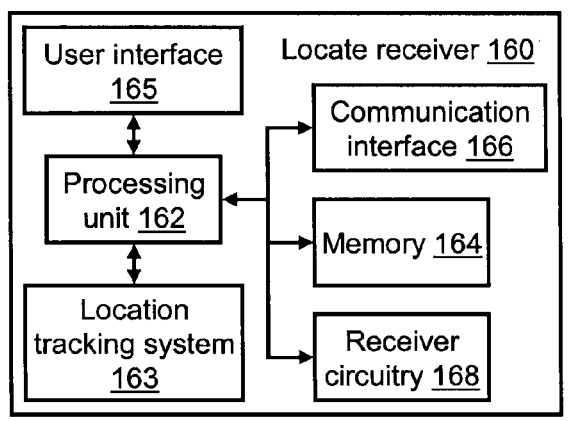
Figure 2C:
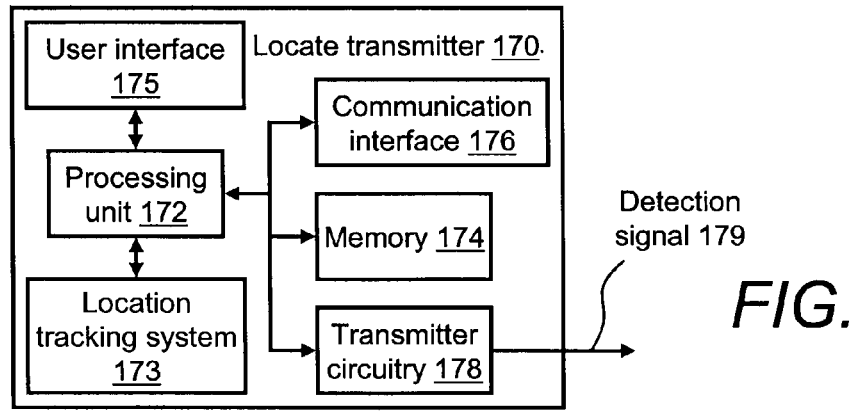

FIGS. 2A, 2B, and 2C are functional block diagrams of an example of marking device 150, locate receiver 160, and locate transmitter 170, respectively, that are suitable for use in locate operations time-keeping system 100.

FIG. 2A shows that marking device 150 may be an electronic marking device. Preferably, marking device 150 is capable of processing information in real time from time-keeping application 116 of central server 110. Marking device 150 may include, for example, a processing unit 152, a location tracking system 153, a memory 154, a user interface 155, a communication interface 156, and an actuation system 158.

Location tracking system 153 of marking device 150 may include any device that can determine its geographical location to a specified degree of accuracy. For example, location tracking system 153 may include a GPS receiver or a global navigation satellite system (GNSS) receiver. A GPS receiver may provide, for example, any standard format data stream, such as a National Marine Electronics Association (NMEA) data stream.

In one example, marking device 150 may be a geo-enabled electronic marking device based on the marking devices described in U.S. Published Application No. 2008/0245299, entitled "Marking system and method;" U.S. Published Application No. 2009/0013928, entitled "Marking system and method;" and U.S. Published Application No. 2008/0228294, entitled "Marking system and method with location and/or time tracking," as well as marking devices having various features according to other U.S. patent publications incorporated by reference herein.

FIG. 2B shows that locate receiver 160 may be an electronic locate receiver device. Preferably, locate receiver 160 is capable of processing information in real time from time-keeping application 116 of central server 110. Locate receiver 160 may include, for example, a processing unit 162, a location tracking system 163, a memory 164, a user interface 165, a communication interface 166, and receiver circuitry 168.

FIG. 2C shows that locate transmitter 170 may be an electronic locate transmitter device. Preferably, locate transmitter 170 is capable of processing information in real time from time-keeping application 116 of central server 110. Locate transmitter 170 may include, for example, a processing unit 172, a location tracking system 173, a memory 174, a user interface 175, a communication interface 176, and transmitter circuitry 178. In one example, locate transmitter 170 may be any commercially available locate transmitter device that is modified to include processing unit 172, location tracking system 173, memory 174, user interface 175, communication interface 176, and transmitter circuitry 178, if not already present therein.

Additionally, locating equipment of locate operations time-keeping system 100 may include a combination locate and marking device (not shown) that is capable of processing information in real time from time-keeping application 116 of central server 110.

Processing unit 152 of marking device 150, processing unit 162 of locate receiver 160, and processing unit 172 of locate transmitter 170 may be substantially the same as processing unit 132 of onsite computers 130 of FIG. 1.

Location tracking system 163 of locate receiver 160 and location tracking system 173 of locate transmitter 170 may be substantially the same as location tracking system 153 of marking device 150 of FIG. 2A.

Memory 154 of marking device 150, memory 164 of locate receiver 160, and memory 174 of locate transmitter 170 may be substantially the same as memory 134 of onsite computer 130 of FIG. 1. Further, time-keeping information from time-keeping application 116 of central server 110 and/or from time-keeping client 136 of onsite computer 130 may be cached locally in memory 154 of marking device 150, memory 164 of locate receiver 160, and/or memory 174 of locate transmitter 170, which may be useful in the event that connectivity is lost between marking device 150, locate receiver 160, and/or locate transmitter 170 and onsite computer 130 and/or central server 110.

User interface 155 of marking device 150, user interface 165 of locate receiver 160, and user interface 175 of locate transmitter 170 may include any mechanism or combination of mechanisms by which the user may operate the devices and by which information that is processed by the devices may be presented to the user. For example, each user interface may include, but is not limited to, a display, a ruggedized touch panel, one or more manual pushbuttons, one or more toggle switches, a keypad, an audio speaker, an audible buzzer or alert mechanism, and any combinations thereof.

Communication interface 156 of marking device 150, communication interface 166 of locate receiver 160, and communication interface 176 of locate transmitter 170 may be substantially the same as communication interface 138 of onsite computers 130 of FIG. 1.

Actuation system 158 of marking device 150 may include a mechanical and/or electrical actuator mechanism (not shown) that may be coupled to an actuator that causes the marking material to be dispensed from the marking dispenser, such as marking dispenser 159. Actuation means starting or causing any device (e.g., marking device 150), program, system, and/or any combination thereof to work, operate, and/or function. Examples of actuation may include, but are not limited to, any local or remote, physical, audible, inaudible, visual, non-visual, electronic, electromechanical, biomechanical, biosensing or other signal, instruction, or event. Actuations of marking device 100 may be performed for any purpose, such as, but not limited to, for dispensing marking material and for capturing any information of any component of marking device 100 without dispensing marking material. Processing unit 152 may be programmed to enable and disable actuation system 158 of marking device 150 based on the time clock status of the user, which is received from time-keeping application 116 of central server 110.

Receiver circuitry 168 of locate receiver 160 may be any receiver circuitry that is found in underground facility locate receiver devices. For example, receiver circuitry 168 may be circuitry that is capable of detecting an electromagnetic field of a certain frequency (or frequency range) and amplitude. An RF antenna (not shown) is associated with receiver circuitry 168 for picking up an electromagnetic field within its effective range. Processing unit 162 may be programmed to enable and disable receiver circuitry 168 of locate receiver 160 based on the time clock status of the user, which is received from time-keeping application 116 of central server 110.

Transmitter circuitry 178 of locate transmitter 170 may be any transmitter circuitry that is found in underground facility locate transmitter devices. For example, transmitter circuitry 178 may be circuitry that is capable of generating a detection signal, such as detection signal 179, that may be coupled to the facility that is the target of the locate operation. The electromagnetic field that is generated along the target facility by, for example, detection signal 179 may be detected by, for example, receiver circuitry 168 of locate receiver 160. The frequency and amplitude of detection signal 179 generated by transmitter circuitry 178 is selectable. Processing unit 172 may be programmed to enable and disable transmitter circuitry 178 of locate transmitter 170 based on the time clock status of the user, which is received from time-keeping application 116 of central server 110.

Referring to FIGS. 1, 2A, 2B, and 2C, in some embodiments, a personal area network (not shown) may exist between marking device 150, locate receiver 160, and locate transmitter 170 for use by their respective communication interfaces. For example, marking device 150, locate receiver 160, and locate transmitter 170 may communicate in a peer-to-peer relationship via the personal area network and one device only (such as marking device 150 being in communication with onsite computer 130 and/or central server 110).

Referring to FIGS. 1, 2A, 2B, and 2C, locate operations time-keeping system 100 is not limited to the configuration shown in FIGS. 1, 2A, 2B, and 2C, in particular, with respect to, for example, wage and hour information 118 and time-keeping application 116 residing on a central server, such as central server 110, and a time-keeping client, such as time-keeping client 136, residing on onsite computer 130, which is in communication with locating equipment, such as marking device 150, locate receiver 160, and locate transmitter 170. The functionality of locate operations time-keeping system 100 with respect to generating and processing real-time prompts and processing clock-in and clock-out information may reside fully or in part on any entity of locate operations time-keeping system 100. In one example, the functionality of locate operations time-keeping system 100 with respect to generating and processing real-time prompts and processing clock-in and clock-out information may reside fully or in part on one or more central servers, one or more onsite computers, one or more marking devices, one or more locate receivers, one or more locate transmitters, and any combinations thereof.

Figure 3:
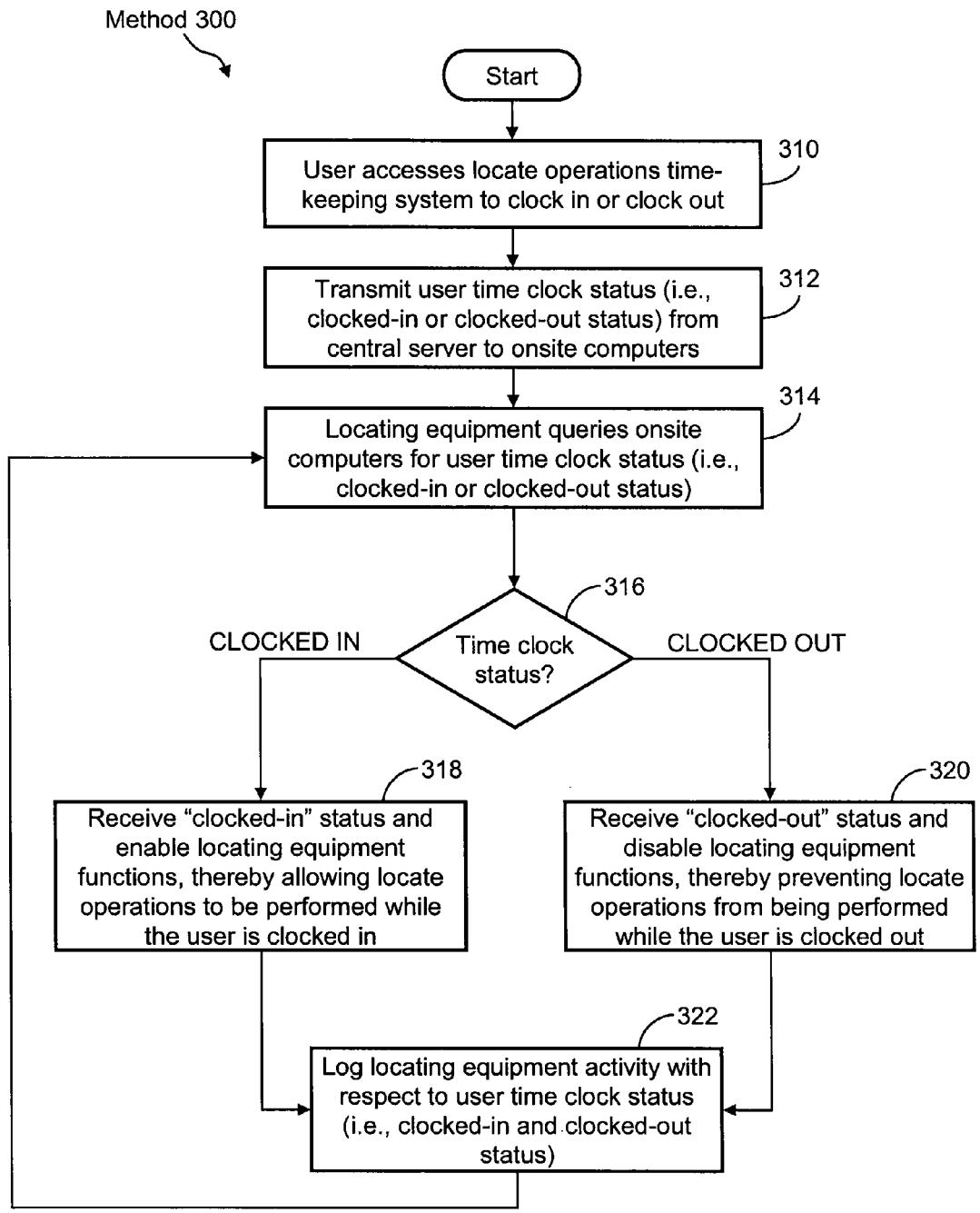
FIG. 3 is a flow diagram of an exemplary method of operation of the locate operations time-keeping system, according to illustrative embodiments.

FIG. 3 is a flow diagram of an example of a method 300 of operation of locate operations time-keeping system 100. Method 300 may include, but is not limited to, the following acts, which may be implemented in any order.

In act 310, the user, such as locate technician 145, may use, for example, his/her onsite computer 130, marking device 150, locate receiver 160, and/or locate transmitter 170 to access time-keeping application 116 of locate operations time-keeping system 100 in order to clock-in or clock-out. Standard clock-in and clock-out processes may be used, such authenticating the user when accessing time-keeping application 116 and then providing standard time-keeping menus. The time-keeping application 116 may receive user identification information from the user and may associate the user identification information with the time clock status of the identified user.

In act 312, the user time clock status (i.e., clocked-in or clocked-out status) and the user identification information are transmitted from central server 110 to onsite computer 130. For example, the time clock status of the user and the user identification information are transmitted from time-keeping application 116 of central server 110 to time-keeping client 136 of computer 130.

In act 314, the locating equipment queries onsite computer 130 for the user time clock status (i.e., clocked-in or clocked-out status). More specifically, at the time of locating equipment power up and/or at any attempt to use the locating equipment, onsite computer 130 may be queried for the user time clock status. In one example, when marking device 150 is powered up and/or when its processing unit 152 senses any attempt to use actuation system 158, the associated onsite computer 130 may be queried for the time clock status of the associated user, such as locate technician 145. In another example, when locate receiver 160 is powered up and/or when its processing unit 162 senses any attempt to use receiver circuitry 168, the associated onsite computer 130 may be queried for the time clock status of the associated user. In yet another example, when locate transmitter 170 is powered up and/or when its processing unit 172 senses any attempt to use transmitter circuitry 178, the associated onsite computer 130 may be queried for the time clock status of the associated user. The locating equipment may provide the user identification information to onsite computer 130 in order to query the time clock status of an individual user. The user identification information may be received by the locating equipment from the user via the user interface, for example a keypad or a smart card.

In act 316, based on the time clock status determined in act 314, if the user's time clock status is "clocked-in," method 300 may proceed, for example, to act 318. However, if the user's time clock status is "clocked-out," method 300 may proceed, for example, to act 320.

In act 318, a clocked-in status of the user is received at the locating equipment and the functions of the locating equipment are enabled, thereby allowing locate operations to be performed while the user is clocked-in. More specifically, when a clocked-in status of the user is received at marking device 150, its processing unit 152 allows, for example, actuation system 158 to be enabled, thereby allowing marking material to be dispensed from marking dispenser 159 while performing locate operations. Additionally, when a clocked-in status of the user is received at locate receiver 160, its processing unit 162 allows, for example, receiver circuitry 168 to be enabled, thereby allowing electromagnetic fields of the target facility to be detected while performing locate operations. Further, when a clocked-in status of the user is received at locate transmitter 170, its processing unit 172 allows, for example, transmitter circuitry 178 to be enabled, thereby allowing detection signal 179 to be transmitted along the target facility while performing locate operations. At the conclusion of this step, method 300 may proceed, for example, to act 322.

In act 320, a clocked-out status of the user is received at the locating equipment and the functions of the locating equipment are disabled, thereby preventing locate operations from being performed while the user is clocked-out. In one example, when a clocked-out status of the user is received at marking device 150, its processing unit 152 disables, for example, actuation system 158, thereby not allowing marking material to be dispensed from marking dispenser 159 when attempting to perform locate operations. In another example, when a clocked-out status of the user is received at locate receiver 160, its processing unit 162 disables, for example, receiver circuitry 168, thereby not allowing electromagnetic fields of the target facility to be detected when attempting to perform locate operations. In yet another example, when a clocked-out status of the user is received at locate transmitter 170, its processing unit 172 disables, for example, transmitter circuitry 178, thereby not allowing detection signal 179 to be transmitted along the target facility when attempting to perform locate operations. This is an example of using locate operations time-keeping system 100 to prevent work from being performed while the user is "off the clock." At the conclusion of this act, method 300 may proceed, for example, to act 322.

In act 322, the locating equipment activity is logged with respect to the user's time clock status (i.e., clocked-in and clocked-out status). In one example, at marking device 150 the user's time clock status as well as the activation history of, for example, actuation system 158 is stored locally in memory 154. In another example, at locate receiver 160 the user's time clock status as well as the activation history of, for example, receiver circuitry 168 is stored locally in memory 164. In yet another example, at locate transmitter 170 the user's time clock status as well as the activation history of, for example, transmitter circuitry 178 is stored locally in memory 174. At the conclusion of act 322, method 300 may end or may return to act 314 and repeat the process.

Additionally, processing unit 152 of marking device 150, processing unit 162 of locate receiver 160, and/or processing unit 172 of locate transmitter 170 may be programmed to log any useful information with respect to the device activity and the user's time clock status. In one example, the locating equipment may be programmed to sense and log any attempts to use the locating equipment while the user has a "clocked-out" status. In another example, the locating equipment may be programmed to log any idle time while the user has a "clocked-in" status. Further, any records that are stored in the activity logs of marking device 150, locate receiver 160, and/or locate transmitter 170 are time-stamped (i.e., include calendar date and time of day). At any time, the contents of memory 154 of marking device 150, memory 164 of locate receiver 160, and/or memory 174 of locate transmitter 170 may be transmitted to onsite computer 130 (and stored in memory 134) and then to central server 110 to be stored in employee time records 120 of workforce management application 112.

Figure 4A:
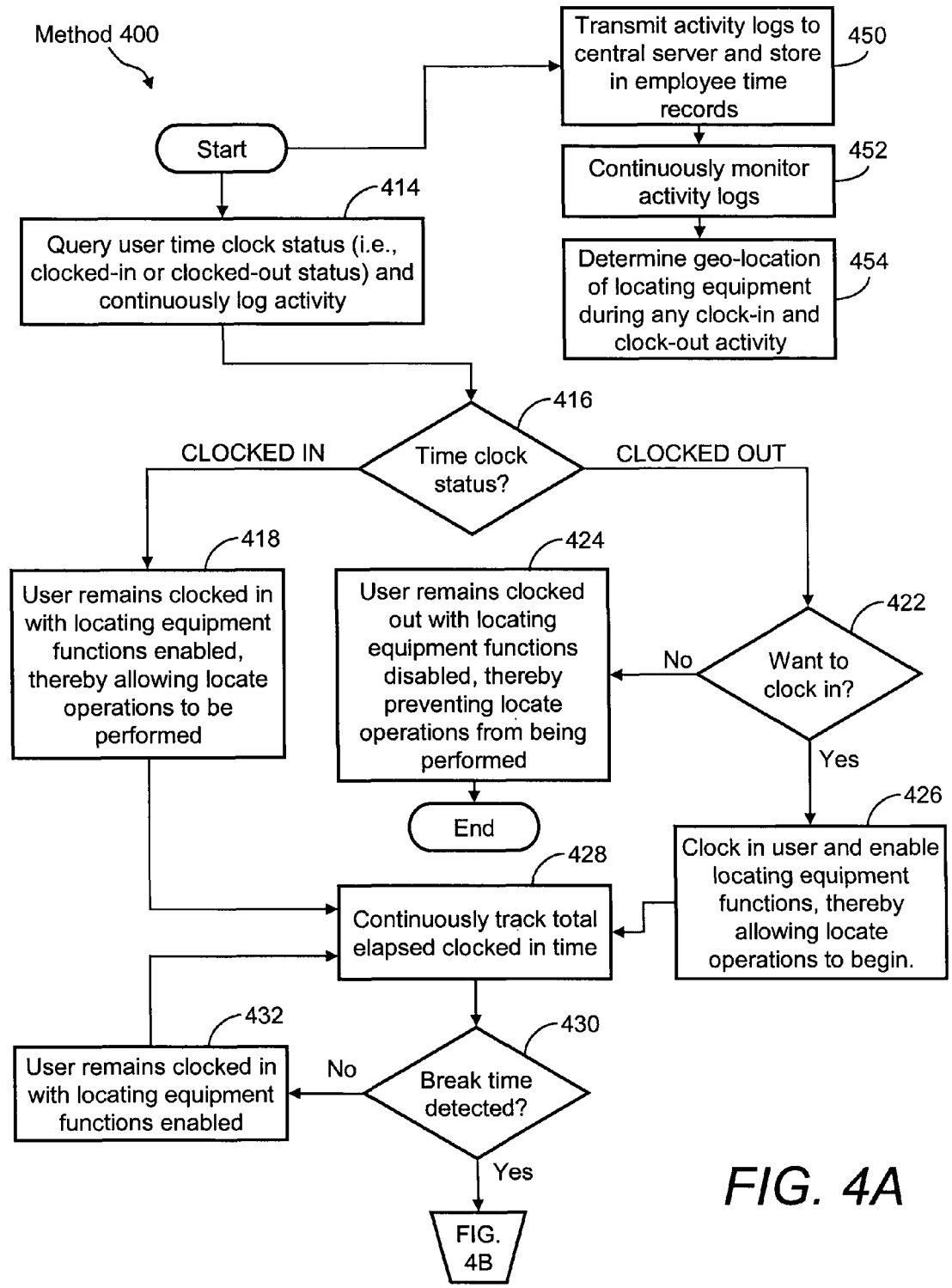
FIGS. 4A and 4B illustrate a flow diagram of an exemplary method of real-time interaction with respect to employee time clock status vs. locating equipment activity using the locate operations time-keeping system, according to illustrative embodiments.
Figure 4B:
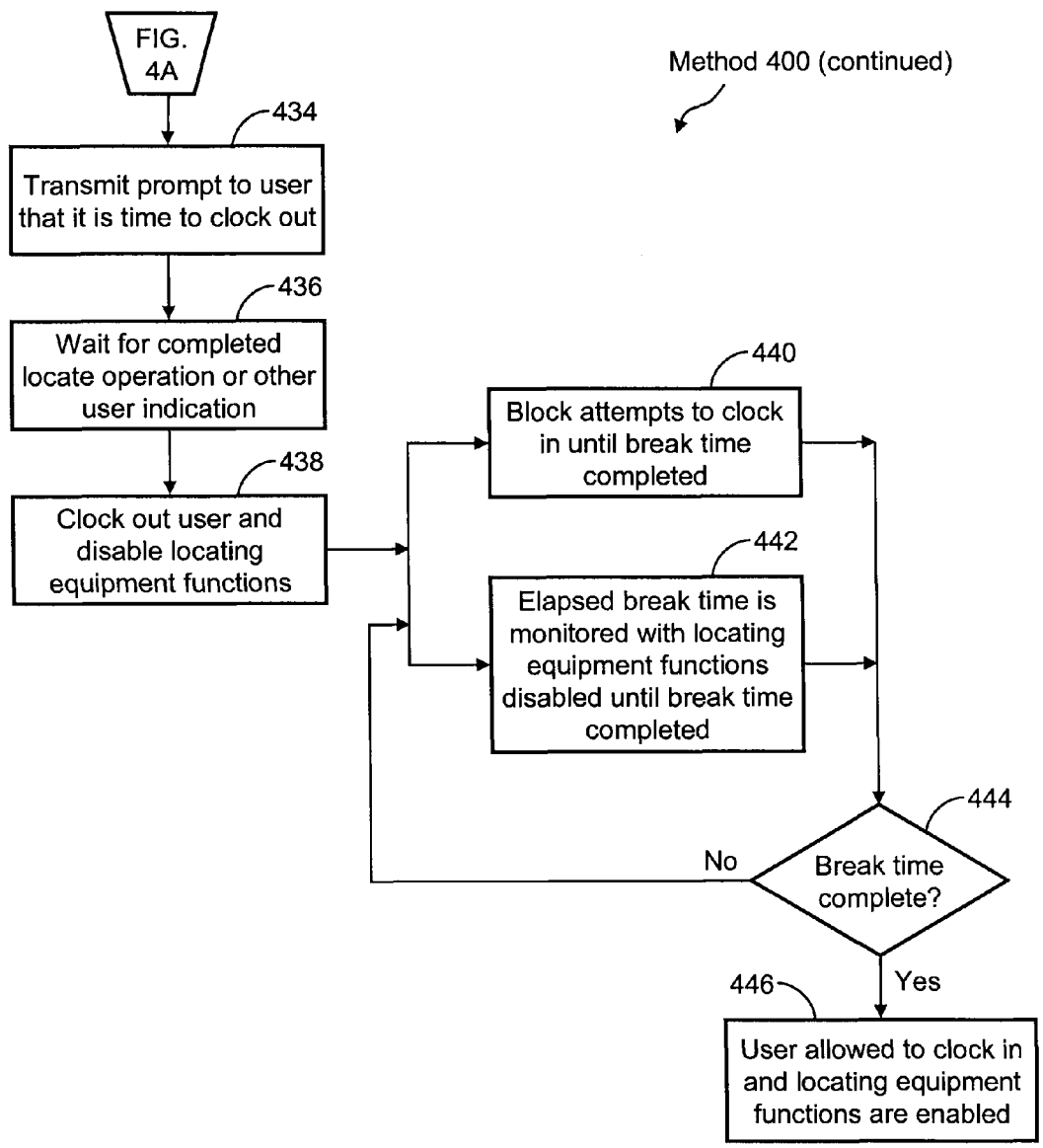

FIGS. 4A and 4B show a flow diagram of an example of a method 400 of real-time interaction with respect to employee time clock status vs. locating equipment activity using locate operations time-keeping system 100. The tasks of the real-time interaction in method 400 are exemplary only and not meant to be limiting. Any real-time interaction scenario is possible using locate operations time-keeping system 100. Method 400 may include, but is not limited to, the following acts, which may be implemented in any order.

In act 414, the locating equipment queries onsite computer 130 and/or central server 110 for the user time clock status (i.e., clocked-in or clocked-out status). More specifically, at the time of locating equipment power up and/or at any attempt to use the locating equipment, onsite computer 130 and/or central server 110 may be queried for the user time clock status. In one example, when marking device 150 is powered up and/or when its processing unit 152 senses any attempt to use actuation system 158, the associated onsite computer 130 may be queried for the time clock status of the associated user, such as locate technician 145. In another example, when locate receiver 160 is powered up and/or when its processing unit 162 senses any attempt to use receiver circuitry 168, the associated onsite computer 130 may be queried for the time clock status of the associated user. In yet another example, when locate transmitter 170 is powered up and/or when its processing unit 172 senses any attempt to use transmitter circuitry 178, the associated onsite computer 130 may be queried for the time clock status of the associated user. As indicated above, the locating equipment may provide the user identification information to onsite computer 130 in order to determine the time clock status of an individual user. The user identification information may be received by the locating equipment from the user via the user interface, for example, a keypad or a smart card reader.

Additionally in act 414, the activity of locating equipment with respect to the user's time clock status is continuously logged as described with reference to act 322 of method 300 of FIG. 3. For example, the activity of marking device 150 is continuously logged in memory 154, the activity of locate receiver 160 is continuously logged in memory 164, and the activity of locate transmitter 170 is continuously logged in memory 174.

In act 416, based on the time clock status determined in act 414, if the user's time clock status is "clocked-in," method 400 may proceed, for example, to act 418. However, if the user's time clock status is "clocked-out," method 400 may proceed, for example, to act 422.

In act 418, the user, such as locate technician 145, remains clocked-in and because the locating equipment detects the clocked-in status, the locating equipment functions are enabled, which allows locate operations to be performed. For example, because of the clocked-in status, actuation system 158 of marking device 150 is enabled, receiver circuitry 168 of locate receiver 160 is enabled, and transmitter circuitry 178 of locate transmitter 170 is enabled, which allows locate operations to be performed.

In act 422, time-keeping application 116 of central server 110 and/or time-keeping client 136 of onsite computer 130 may present a real-time prompt via the user interfaces of the locating equipment in order to determine whether the user wishes to clock-in or to remain clocked-out. In one example, the locating equipment may be programmed to sense and log any attempts to use the locating equipment while the user has a "clocked-out" status. Upon sensing this attempt, which may be transmitted in real-time from the locating equipment to time-keeping application 116 of central server 110 and/or time-keeping client 136 of onsite computer 130, a real-time prompt may be generated and transmitted to the locating equipment. For example, the real-time prompt may be a text message, such as "You are currently clocked-out. Do you want to clock-in?", that may be displayed to the user, for example, via user interface 155 of marking device 150, user interface 165 of locate receiver 160, and/or user interface 175 of locate transmitter 170. The user may then utilize user interface 155 of marking device 150, user interface 165 of locate receiver 160, and/or user interface 175 of locate transmitter 170 to issue a response. Additionally, the user may use onsite computer 130 to issue a response. This is an example of using the user interfaces of the locating equipment itself to perform user clock-in and clock-out operations. If the user's response is to remain clocked-out, method 400 may proceed, for example, to act 424. However, if the user's response is to be clocked-in, method 400 may proceed, for example, to act 426.

Optionally, with respect to act 422, the user may be automatically clocking in based on usage of the locating equipment. For example, upon sensing an attempt to use marking device 150, locate receiver 160, and/or user locate transmitter 170, time-keeping application 116 of central server 110 and/or time-keeping client 136 of onsite computer 130 may automatically verify user information, ticket information, and whether the locating equipment is at the correct location based on the ticket information. If all information is as expected, the user may be automatically clocked-in without transmitting the real-time prompt of "You are currently clocked-out. Do you want to clock-in?" and waiting for the user's response.

In act 424, the user, such as locate technician 145, remains clocked-out and because the locating equipment detects the clocked-out status, the locating equipment functions are disabled, which prevents locate operations from being performed. For example, because of the clocked-out status, actuation system 158 of marking device 150 is disabled, receiver circuitry 168 of locate receiver 160 is disabled, and transmitter circuitry 178 of locate transmitter 170 is disabled, which prevents locate operations from being performed. This is an example of using locate operations time-keeping system 100 to prevent work from being performed while the user is "off the clock."

In act 426, the user is clocked-in and the locating equipment functions are enabled, thereby allowing locate operations to begin. For example, time-keeping application 116 of central server 110 and/or time-keeping client 136 of onsite computer 130 changes the user's time status to "clocked-in" and the functions of marking device 150, locate receiver 160, and/or locate transmitter 170 are enabled, thereby allowing locate operations to begin.

In act 428, throughout method 400, the total elapsed clocked-in time for a given user is continuously tracked by time-keeping application 116 of central server 110 and/or time-keeping client 136 of onsite computer 130 and then correlated to guidelines in wage and hour information 118. In this way, it may be determined whether a break time is due according to the applicable wage and hour regulations. In one example, wage and hour information 118 may indicate that a 15-minute break is required every two hours. In another example, wage and hour information 118 may indicate that a 30-minute meal break is required every four hours.

In act 430, based on the total elapsed clocked-in time determined in act 428, if it is determined that a break time is not due according to wage and hour information 118, method 400 may proceed, for example, in act 432. However, if it is determined that a break time is due according to wage and hour information 118, method 400 may proceed, for example, to act 434.

In act 432, the user, such as locate technician 145, remains clocked-in and because the locating equipment detects the clocked-in status, the locating equipment functions are enabled, which allows locate operations to be performed. For example, because of the clocked-in status, actuation system 158 of marking device 150 is enabled, receiver circuitry 168 of locate receiver 160 is enabled, and transmitter circuitry 178 of locate transmitter 170 is enabled, which allows locate operations to be performed. At the conclusion of act 432, method 400 may return, for example, to act 428.

In act 434, a real-time prompt may be transmitted to the user that it is time to clock-out. More specifically, time-keeping application 116 of central server 110 and/or time-keeping client 136 of onsite computer 130 may present a real-time prompt via the user interfaces of the locating equipment in order to inform the user that it is time to clock-out. In one example, time-keeping application 116 of central server 110 and/or time-keeping client 136 of onsite computer 130 may generate a real-time prompt that is transmitted to the locating equipment. For example, the real-time prompt may be a text message, such as "It's time for your 30-minute meal break" or "It's time for your 15-minute coffee break", that may be displayed to the user, for example, via user interface 155 of marking device 150, user interface 165 of locate receiver 160, and/or user interface 175 of locate transmitter 170.

Additionally, in act 434 the real-time prompts may be delivered in advance of the actual break time that is due in order to provide advanced notice to locate technicians. For example, time-keeping application 116 may automatically transmit a real-time prompt, for example, 15, 30, or 60 minutes in advance of the actual break time that is due. An example of such a prompt may be "Your scheduled 15-minute break will be coming up in a half hour. If possible, please be prepared to clock-out at that time."

In act 436, instead of immediately disabling the locating equipment because the user is due to clock-out for a break, it may be more practical to allow the locate operation to continue until the ticket is completed and/or to allow work to continue pending some other indication by the user. Therefore, time-keeping application 116 of central server 110 and/or time-keeping client 136 of onsite computer 130 may allow work to continue, perhaps for some limited amount of time (e.g., a half hour), in order to allow the ticket to be completed and/or to receive some other indication from the user that a good stopping point is reached. The user may utilize user interface 155 of marking device 150, user interface 165 of locate receiver 160, and/or user interface 175 of locate transmitter 170 to indicate to time-keeping application 116 and/or time-keeping client 136 his/her desire to delay the clock-out event and then later to indicate the completed ticket and/or any other reason to initiate the clock-out event. Additionally, the user may use onsite computer 130 to issue a response to the prompt.

In act 438, once the user has indicated in act 426 that he/she is ready to initiate the clock-out event, time-keeping application 116 of central server 110 and/or time-keeping client 136 of onsite computer 130 changes the user's time clock status to clocked-out and the locating equipment functions are disabled. For example, once the user is clocked-out, actuation system 158 of marking device 150 is disabled, receiver circuitry 168 of locate receiver 160 is disabled, and transmitter circuitry 178 of locate transmitter 170 is disabled, which prevents locate operations from being performed. This is another example of using locate operations time-keeping system 100 to prevent work from being performed while the user is "off the clock."

In act 440, while the required break time is in progress, any attempts to clock back in are automatically blocked until the required break time completed. More specifically, following the guidelines in wage and hour information 118, time-keeping application 116 of central server 110 and/or time-keeping client 136 of onsite computer 130 logs the start time of the break and automatically blocks any attempts by the user to clock back in until the required amount of time (e.g., 15 minutes or 30 minutes) has passed. For example, when a required 30-minute break begins at 12:17 pm, any attempts by the user to clock back in before 12:47 pm are automatically blocked. This is an example of using locate operations time-keeping system 100 to (1) ensure wage and hour compliance according to wage and hour information 118 and (2) prevent work from being performed while the user is "off the clock."

Additionally, by monitoring the activity log information that is returned to central computer 110 and stored employee time records 120, supervisors (not shown) associated with central server 110 may be alerted to certain activities of locate technicians 145 in the field. For example, supervisors may be alerted when locate technicians 145 are attempting to perform work when "off the clock." These alerts may allow supervisors to address and correct the problems.

In act 442, the elapsed break time is monitored with the locating equipment functions disabled until the break time is completed. More specifically, time-keeping application 116 of central server 110 and/or time-keeping client 136 of onsite computer 130 monitors the elapsed break time based on its start time and, for example, actuation system 158 of marking device 150, receiver circuitry 168 of locate receiver 160, and transmitter circuitry 178 of locate transmitter 170 remain disabled until the break time is complete, thereby preventing locate operations from being performed during the break.

In act 444, based on the elapsed break time determined in act 442, if the break time is complete, method 400 may proceed, for example, to act 446. However, if the break time is not complete, method 400 may return, for example, to acts 440 and 442.

In act 446, the user is allowed to clock-in and the locating equipment functions are enabled. More specifically, because the break time is complete, time-keeping application 116 of central server 110 and/or time-keeping client 136 of onsite computer 130 allows the user to clock back in. As a result, actuation system 158 of marking device 150, receiver circuitry 168 of locate receiver 160, and transmitter circuitry 178 of locate transmitter 170 are enabled, which allows locate operations to be performed.

In act 450, at any time throughout method 400, activity logs of locating equipment may be transmitted to central server 110. For example, at any time throughout method 400, the contents of memory 154 of marking device 150, memory 164 of locate receiver 160, and/or memory 174 of locate transmitter 170 may be transmitted to onsite computer 130 (and stored in memory 134) and then to central server 110 to be stored in employee time records 120 of workforce management application 112.

In act 452, the activity logs of locating equipment are continuously monitored. For example, the contents of the activity logs that are received from marking device 150, locate receiver 160, and/or locate transmitter 170 may be continuously monitored throughout the steps of method 400 by time-keeping application 116 of central server 110 and/or time-keeping client 136 of onsite computer 130.

In act 454, at any clock-in and clock-out activity throughout method 400, the geo-location of the locating equipment may be determined. The geo-location of the locating equipment may be useful for:

Determining the controlling wage and hour regulations for the job site. For example, time-keeping client 136 of onsite computer 130 may acquire the current geo-location information of, for example, location tracking system 153 of marking device 150, location tracking system 163 of locate receiver 160, and/or location tracking system 173 of locate transmitter 170. Based on this geo-location information, time-keeping client 136 automatically queries wage and hour information 118 at central server 110 for the wage and hour guidelines of the regulatory body that corresponds to the location of the work site. This information may be used throughout method 400 to guide the generation of the real-time prompts and ensure compliance with the selected wage and hour guidelines; and Verifying whether the locate technician is clocked-in or clocked-out at the correct job site with respect to the ticket information. For example, time-keeping client 136 of onsite computer 130 may acquire the current geo-location information of, for example, location tracking system 153 of marking device 150, location tracking system 163 of locate receiver 160, and/or location tracking system 173 of locate transmitter 170. Time-keeping client 136 may then compare the actual geo-location information to the expected location information of the associated locate request ticket (not shown) in order to verify that the locate technician is clocked-in or clocked-out at the correct job site. A real-time prompt may be generated in the event of a mismatch, such as "You appear to be in the wrong location. Please check the location information on the ticket."

Referring to FIGS. 1 through 4B, in some aspects locate operations time-keeping system 100 may facilitate user review of clock-in and clock-out activity. In one example, at the end of the day, users may review their clock-in and clock-out activity using, for example, onsite computer 130, marking device 150, locate receiver 160, and/or locate transmitter 170 in order to confirm and/or modify the information therein before transmitting to central server 110.

Referring to FIGS. 1 through 4B, in some aspects locate operations time-keeping system 100 may facilitate user override of the ability of time-keeping application 116 to block the use of locating equipment based on the user's clock-in and clock-out status. For example, this override mechanism may be useful in the event of an emergency situation that requires the use of locating equipment. The override mechanism (not shown) may require the user to enter the reason for the override, which may be logged, for example, in employee time records 120. In one exemplary implementation, the processing unit 132 may control user interface 135 to receive a technician override input to inhibit disabling of the at least one piece of locate equipment based on time code status and/or wage and hour compliance information. In aspect of such an implementation, in response to the technician override input, the processing unit may control communication interface 138 to provide one or more supervisor notification messages (e.g., to the workforce management application 112 of the central server) indicating receipt of the technician override input. In another aspect, the processing unit may await receipt of a supervisor approval signal (e.g., via the communication interface 138), in response to the supervisor notification message(s), before allowing the technician override input to inhibit disabling of the locate equipment if disabling is otherwise called-for based on time code status and/or wage and hour compliance information.

In other embodiments, other intelligence may be incorporated into locate operations time-keeping system 100 with respect to generating prompts. For example, advanced knowledge of the expected locate operation duration may be useful with respect to generating prompts. In one example, when the expected duration of a locate operation is about two hours and a 15-minute break time is due in the next 30 minutes, a prompt may be provided to suggest taking the break before starting the two-hour locate operation.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for controlling at least one piece of locating equipment used by a locate technician to perform a locate and/or marking operation so as to automatically ensure wage and hour compliance with a regulatory standard, the apparatus comprising:
    a memory to store processor-executable instructions; and
    at least one processing unit communicatively coupled to the memory, wherein upon execution of the processor-executable instructions, the at least one processing unit:
        A) generates at least one control signal to at least partially enable or disable the at least one piece of locating equipment based at least in part on:
            a time clock status of the locate technician; and/or
            wage and hour compliance information associated with the regulatory standard, the regulatory standard being applicable to 1) the locate technician and/or 2) a geographic location of the work site, wherein:
        the enabling or disabling of the at least one piece of locating equipment in A) is performed to ensure compliance with the regulatory standard; and
        the locate and/or marking operation comprises detecting and/or marking a presence or an absence of at least one underground facility at a work site.

2. The apparatus of claim 1, wherein in A) the at least one processing unit generates the at least one control signal based at least in part on the time clock status of the locate technician, wherein the time clock status indicates one of a clocked-in status and a clocked-out status for the locate technician, and wherein the at least one processing unit:
    generates at least one first control signal to at least partially enable the at least one piece of locating equipment if the time clock status indicates the clocked-in status; and
    generates at least one second control signal to at least partially disable the at least one piece of locating equipment if the time clock status indicates the clocked-out status.

3. The apparatus of claim 1, wherein in A) the at least one processing unit generates the at least one control signal based at least in part on the wage and hour compliance information, wherein the wage and hour compliance information includes break information and/or maximum hours information for the locate technician, and wherein the at least one processing unit:
    generates the at least one control signal to at least partially enable or disable the at least one piece of locating equipment based at least in part on the break information and/or the maximum hours information.

4. The apparatus of claim 3, wherein the at least one processing unit generates the at least one control signal so as to at least partially disable the at least one piece of locating equipment if the break information and the time clock status indicate that a locate technician break is required.

5. The apparatus of claim 3, wherein the time clock status includes an elapsed clocked-in time of the locate technician, and wherein the at least one processing unit generates the at least one control signal so as to at least partially disable the at least one piece of locating equipment if the elapsed clocked-in time of the locate technician exceeds a maximum number of hours indicated in the maximum hours information.

6. The apparatus of claim 1, wherein the at least one processing unit monitors a use of the at least one piece of locating equipment by the locate technician and automatically changes the time code status of the locate technician based on the use of the locating equipment.

7. The apparatus of claim 1, further comprising the at least one piece of locating equipment, wherein the at least one piece of locating equipment includes the memory and the at least one processing unit.

8. The apparatus of claim 1, further comprising at least one communication interface communicatively coupled to the at least one processing unit, wherein the at least one processing unit:
    controls the at least one communication interface to transmit the at least one control signal to at least one external device so as to facilitate control of the at least one piece of locating equipment.

9. A system comprising:
the apparatus of claim 8; and
the at least one external device,
wherein the at least one external device comprises at least one of:
at least one computing device located proximate to the work site; and
the at least one piece of locating equipment.

10. The system of claim 9, wherein the apparatus comprises a central server of a locate company.

11. The system of claim 9, wherein the apparatus comprises the at least one computing device located proximate to the work site, and wherein the at least one external device comprises the at least one piece of locating equipment.

12. The apparatus of claim 1, further comprising at least one communication interface communicatively coupled to the at least one processing unit, wherein the at least one processing unit:
controls the at least one communication interface to receive the time clock status of the locate technician and/or the wage and hour compliance information from at least one external device.

13. The apparatus of claim 1, wherein the at least one processing unit:
B) determines the time clock status of the locate technician based at least in part on user identification information associated with the locate technician.

14. The apparatus of claim 13, wherein in B), the at least one processing unit accesses at least one of employee time records and the wage and hour compliance information based on the user identification information associated with the locate technician.

15. The apparatus of claim 14, wherein the memory stores the at least one of the employee time records and the wage and hour compliance information, and wherein the at least one processing unit controls the memory so as to access the at least one of the employee time records and the wage and hour compliance information.

16. The apparatus of claim 14, wherein in B), the at least one processing unit determines the time clock status of the locate technician based at least in part on the wage and hour compliance information, and wherein the at least one processor selects the wage and hour compliance information based at least in part on a first geographic location of the work site as specified in at least one locate request ticket, and/or a second geographic location of the at least one piece of locating equipment recorded during use by the locate technician at the work site.

17. The apparatus of claim 1, wherein the at least one processing unit receives or determines the time clock status of the locate technician and/or the wage and hour compliance information upon power-up of the at least one piece of locate equipment or use of the at least one piece of locate equipment to perform the locate and/or marking operation.

18. The apparatus of claim 1, wherein the at least one processing unit logs into the memory at least one of an elapsed clocked-in time and an elapsed clocked-out time for the locate technician.

19. The apparatus of claim 18, wherein the at least one processing unit logs into the memory locate equipment information associated with use of the at least one piece of locating equipment by the locate technician.

20. The apparatus of claim 19, wherein the at least one processing unit monitors the time clock status and the locate equipment information during performance of the locate and/or marking operation, and stores in the memory an activity log including at least some of the monitored time clock status and the monitored locate equipment information so as to provide an electronic record of the locate and/or marking operation.

21. The apparatus of claim 20, wherein the at least one processing unit generates the activity log so as to include a plurality of time-stamped entries corresponding to the at least some of the monitored time clock status and the monitored locate equipment information.

22. The apparatus of claim 1, further comprising at least one user interface communicatively coupled to the at least one processing unit to provide first information to and/or receive second information from the locate technician.

23. The apparatus of claim 22, wherein the at least one processing unit generates the at least one control signal to at least partially enable or disable the at least one piece of locating equipment without disabling the at least one user interface.

24. The apparatus of claim 22, wherein the at least one processing unit controls the at least one user interface to display the time clock status.

25. The apparatus of claim 22, wherein the at least one processing unit controls the at least one user interface to prompt the locate technician to clock-in or clock-out based at least in part on the time clock status and/or the wage and hour compliance information.

26. The apparatus of claim 22, wherein the at least one processing unit controls the at least one user interface to prompt the locate technician to clock-in if the time clock status indicates a clocked-out status for the locate technician.

27. The apparatus of claim 22, wherein the at least one processing unit controls the at least one user interface to prompt the locate technician to clock-out if the wage and hour compliance information indicates that a break is required.

28. The apparatus of claim 22, wherein the at least one processing unit controls the at least one user interface to provide at least one advance notification of an upcoming break to the locate technician if the wage and hour compliance information indicates that a break is required.

29. The apparatus of claim 22, wherein the time clock status includes an elapsed clocked-in time of the locate technician and wherein the wage and hour compliance information includes maximum hours information, and wherein the at least one processing unit controls the at least one user interface to prompt the locate technician to clock-out if the elapsed clocked-in time of the locate technician exceeds a maximum number of hours indicated in the maximum hours information.

30. The apparatus of claim 22, wherein the at least one processing unit controls the at least one user interface to receive a technician override input to inhibit disabling of the at least one piece of locate equipment in response to the at least one control signal.

31. The apparatus of claim 30, further comprising at least one communication interface communicatively coupled to the at least one processing unit, wherein, in response to the technician override input, the at least one processing unit controls the at least one communication interface to:
provide at least one supervisor notification message indicating receipt of the technician override input.

32. The apparatus of claim 31, wherein the at least one processing unit:
further controls the at least one communication interface to receive a supervisor approval message in response to the at least one supervisor notification message; and
inhibits disabling of the at least one piece of locate equipment in response to the at least one control signal only upon receipt of the supervisor approval message.

33. A computer-implemented method, performed using a computer system comprising a memory to store processor-executable instructions and at least one processing unit communicatively coupled to the memory, for controlling at least one piece of locating equipment used by a locate technician to perform a locate and/or marking operation so as to automatically ensure wage and hour compliance with a regulatory standard, the method comprising:
- A) in a first computer process performed by the processing unit, monitoring a time clock status of the locate technician and/or wage and hour compliance information associated with the regulatory standard, the regulatory standard being applicable to 1) the locate technician and/or 2) a geographic location of the work site; and
- B) in a second computer process performed by the processing unit, generating at least one control signal to at least partially enable or disable the at least one piece of locating equipment based at least in part on A);
- wherein the enabling or disabling of the at least one piece of locating equipment is performed to ensure compliance with the regulatory standard; and
- wherein the locate and/or marking operation comprises detecting and/or marking a presence or an absence of at least one underground facility at a work site.

34. The method of claim 33, wherein B) comprises generating the at least one control signal based at least in part on the time clock status of the locate technician, wherein the time clock status indicates one of a clocked-in status and a clocked-out status for the locate technician, and wherein B) further comprises:
- generating at least one first control signal to at least partially enable the at least one piece of locating equipment if the time clock status indicates the clocked-in status; and
- generating at least one second control signal to at least partially disable the at least one piece of locating equipment if the time clock status indicates the clocked-out status.

35. The method of claim 33, wherein B) comprises generating the at least one control signal based at least in part on the wage and hour compliance information, wherein the wage and hour compliance information includes break information and/or maximum hours information for the locate technician, and wherein B) further comprises:
- B1) generating the at least one control signal to at least partially enable or disable the at least one piece of locating equipment based at least in part on the break information and/or the maximum hours information.

36. The method of claim 35, wherein B1) comprises generating the at least one control signal so as to at least partially disable the at least one piece of locating equipment if the break information and the time clock status indicate that a locate technician break is required.

37. The method of claim 35, wherein the time clock status includes an elapsed clocked-in time of the locate technician, and wherein B1) comprises generating the at least one control signal so as to at least partially disable the at least one piece of locating equipment if the elapsed clocked-in time of the locate technician exceeds a maximum number of hours indicated in the maximum hours information.

38. The method of claim 33, further comprising:
- monitoring a use of the at least one piece of locating equipment by the locate technician and;
- automatically changing the time code status of the locate technician based on the use of the locating equipment.

39. The method of claim 33, further comprising:
- C) determining the time clock status of the locate technician based at least in part on user identification information associated with the locate technician.

40. The method of claim 39, wherein C) comprises accessing at least one of employee time records and the wage and hour compliance information based on the user identification information associated with the locate technician.

41. At least one non-transitory computer-readable storage medium encoded with processor-executable instructions that, when executed by at least one processing unit, perform a method for controlling at least one piece of locating equipment used by a locate technician to perform a locate and/or marking operation so as to automatically ensure wage and hour compliance with a regulatory standard, the method comprising:
- A) monitoring a time clock status of the locate technician and/or wage and hour compliance information associated with the regulatory standard, the regulatory standard being applicable to 1) the locate technician and/or 2) a geographic location of the work site; and
- B) generating at least one control signal to at least partially enable or disable the at least one piece of locating equipment based at least in part on A);
- wherein the enabling or disabling of the at least one piece of locating equipment is performed to ensure compliance with the regulatory standard; and
- wherein the locate and/or marking operation comprises detecting and/or marking a presence or an absence of at least one underground facility at a work site.

* * * * *